(12) United States Patent
Dennis et al.

(10) Patent No.: US 8,052,220 B2
(45) Date of Patent: Nov. 8, 2011

(54) SEAT BELT TONGUE

(75) Inventors: Nathaniel James Dennis, Grand Blanc, MI (US); Mark Francis Gray, Sterling Heights, MI (US)

(73) Assignee: TK Holdings Inc., Auburn Hills, MI (US)

( * ) Notice: Subject to any disclaimer, the term of this patent is extended or adjusted under 35 U.S.C. 154(b) by 324 days.

(21) Appl. No.: 12/385,142

(22) Filed: Mar. 31, 2009

(65) Prior Publication Data

US 2010/0244541 A1  Sep. 30, 2010

(51) Int. Cl.
*B60R 21/00* (2006.01)
(52) U.S. Cl. .......................................... 297/480
(58) Field of Classification Search .................... 24/171, 24/265 BC; 297/480, 476, 474, 468
See application file for complete search history.

(56) References Cited

U.S. PATENT DOCUMENTS

| | | | |
|---|---|---|---|
| 2,919,481 A | 1/1960 | Finken et al. | |
| 4,588,207 A * | 5/1986 | Doty | 280/801.1 |
| 4,878,271 A | 11/1989 | Kitokovski | |
| 4,878,272 A | 11/1989 | Kotikovsky et al. | |
| 4,893,874 A | 1/1990 | Childress et al. | |
| 4,935,994 A | 6/1990 | Boone et al. | |
| 4,962,572 A | 10/1990 | Prentkowski | |
| 5,023,980 A | 6/1991 | Thomas | |
| 5,058,244 A | 10/1991 | Fernandez | |
| 5,309,606 A * | 5/1994 | Kawamura | 24/196 |
| 5,806,148 A | 9/1998 | McFalls et al. | |
| 7,325,280 B2 | 2/2008 | Ichida | |
| 7,871,132 B2 * | 1/2011 | Rogers | 297/469 |

* cited by examiner

*Primary Examiner* — Milton Nelson, Jr.
(74) *Attorney, Agent, or Firm* — Foley & Lardner LLP

(57) ABSTRACT

A seat belt system for use in a vehicle, which includes a seat belt webbing for restraining an occupant of the vehicle, wherein the webbing includes a first end and a second end, wherein the first end of the webbing is attached to a retractor for either retracting the webbing or permitting withdrawal of the webbing, and wherein the second end of the webbing is connected to an anchor; a tongue mechanism connected to the webbing and positioned to separate the webbing into a lap portion and a shoulder portion; and a buckle mechanism configured to detachably couple with the tongue mechanism. The tongue mechanism is configured so that the tongue mechanism is slideably coupled to the webbing when the tension in the webbing is less than a cinching load, and when the tension in the webbing is equal to or greater than the cinching load the tongue mechanism applies a cinching force on the webbing to prevent the webbing from changing position relative to the tongue mechanism. The tongue mechanism is further configured so that when the tension in the webbing is less than the cinching load there is no cinching force applied to the webbing.

9 Claims, 7 Drawing Sheets

SEAT BELT TONGUE

BACKGROUND

The present application relates generally to the field of vehicle seat belt systems which provide occupant protection during a dynamic vehicle impact event. More specifically, the disclosure relates to an improved tongue mechanism for a seat belt system.

Motor vehicles have been equipped with seat belt systems coupled or integrated with seat systems. During a vehicle dynamic impact event, the seat belt system restrains an occupant with a seat belt or webbing to the seat system, providing protection to the occupant. Among the conventional seat belt systems, a three point seat belt system is generally known and employed. The typical method of configuring a three point seat belt system is to connect the seat belt or webbing fixedly at one end to the vehicle or seat system, connect the other end fixedly to the seat belt retractor, and slideably couple a tongue to the webbing between its ends. The tongue then may be detachably coupled to a buckle mechanism positioned on the side of the seat opposite to the anchor and retractor connections of the webbing. Thereby, when the tongue is latched to the buckle mechanism, the webbing forms a lap portion which extends across the lap of the occupant between the anchor and tongue connections of the webbing; and forms a shoulder portion which extends diagonally across the torso of the occupant and over the shoulder of the occupant, between the tongue and retractor connections of the webbing.

It has been known to make a tongue mechanism slideable along the length of a continuous loop of webbing to allow the occupant to adjust the lengths of the lap and shoulder portions of the seat belt. It has also been known to construct a tongue mechanism that includes a cinch mechanism, having a lock bar that is driven by belt tension from the latching of the tongue and buckle mechanisms to cinch the webbing of the seat belt system. There are two primary types of tongue mechanisms having cinch mechanisms. The first type are non-free falling tongues, which the cinch mechanism engages the webbing as soon as the seat belt has tension. The second type are tongue mechanisms progressively engage their cinch mechanism with each successive tensile force through the webbing. These tongues continually shorten the webbing (i.e., tighten the webbing around the occupant) over time, resulting from forces transmitted during normal vehicle driving (e.g., from hitting a bump or pot-hole, or from vehicle stability) through the webbing. Therefore the seat belt systems that employ these tongue mechanisms become more uncomfortable for the occupant during use or over time.

It would be advantageous to construct a tongue mechanism that has free-falling capability, and includes a cinch mechanism which engages at a pre-determined belt tension, then disengages when the belt tension drops below the pre-determined amount. It would also be advantageous for this tongue mechanism not to progressively tighten the webbing around the occupant over time during normal vehicle use.

SUMMARY

This application relates to a seat belt system for use in a vehicle, which includes a seat belt webbing for restraining an occupant of the vehicle, wherein the webbing includes a first end and a second end, wherein the first end of the webbing is attached to a retractor for either retracting the webbing or permitting withdrawal of the webbing, and wherein the second end of the webbing is connected to an anchor; a tongue mechanism connected to the webbing and positioned to separate the webbing into a lap portion and a shoulder portion; and a buckle mechanism configured to detachably couple with the tongue mechanism. The tongue mechanism is configured so that the tongue mechanism is slideably coupled to the webbing when the tension in the webbing is less than a cinching load, and when the tension in the webbing is equal to or greater than the cinching load the tongue mechanism applies a cinching force on the webbing to prevent the webbing from changing position relative to the tongue mechanism. The tongue mechanism is further configured so that when the tension in the webbing is less than the cinching load there is no cinching force applied to the webbing.

The tongue mechanism includes a tongue plate and a cinch plate and wherein the cinching force on the webbing is applied by changing the position of the cinch plate relative to the tongue plate. The tongue mechanism further includes a blocking member located in a first position to prevent relative movement between the cinch plate and the tongue plate and wherein the tongue mechanism is configured so that the position of the blocking member changes from the first position to a second position when the tensile force on the webbing meets or exceeds the cinching load to thereby permit relative movement between the cinch plate and the tongue plate.

The tongue mechanism may include a first biasing member for biasing the blocking member from the second position into the first position, and may include a second biasing member for biasing the cinch plate into a position that permits relative movement between the webbing and the tongue mechanism and wherein the tongue mechanism is configured so that when the tensile force on the webbing drops below the cinching load after having previously exceeded the cinching load the second biasing member forces the cinch plate into a position wherein the blocking member can be forced into the first position by the first biasing member.

DETAILED DESCRIPTION

Figure 1:
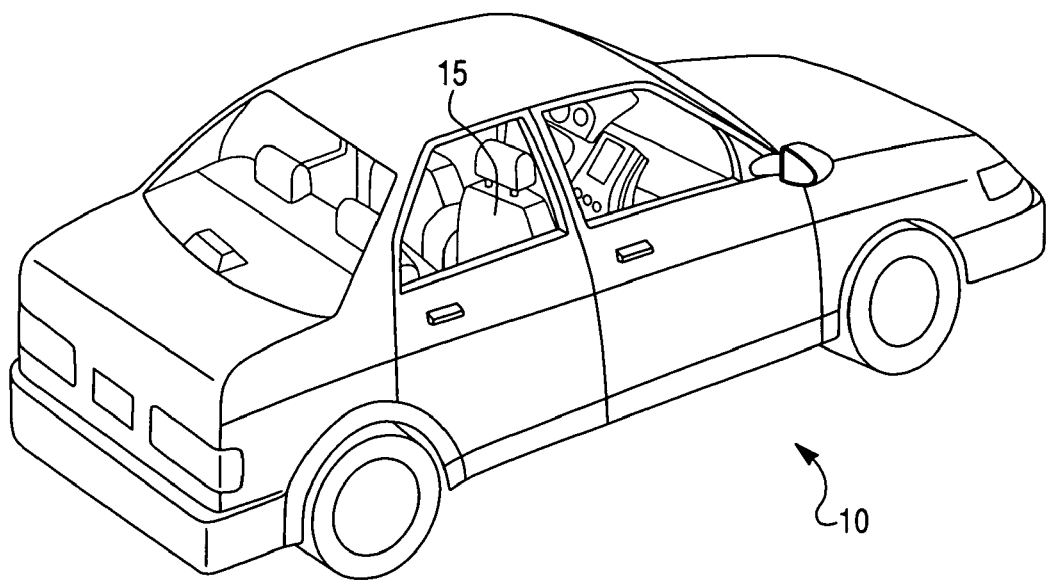
FIG. 1 is a perspective view of a motor vehicle according to an exemplary embodiment.

Referring to FIG. 1, an exemplary embodiment of a motor vehicle 10 is illustrated, and includes an occupant safety system 15. The vehicle 10 is illustrated as a typical sedan, but a safety system as disclosed in this application may be used on any type of passenger vehicle as well as other moving vehicles that offer occupant protection to seated passengers in the form of safety systems which include a seat belt assembly.

Figure 2:
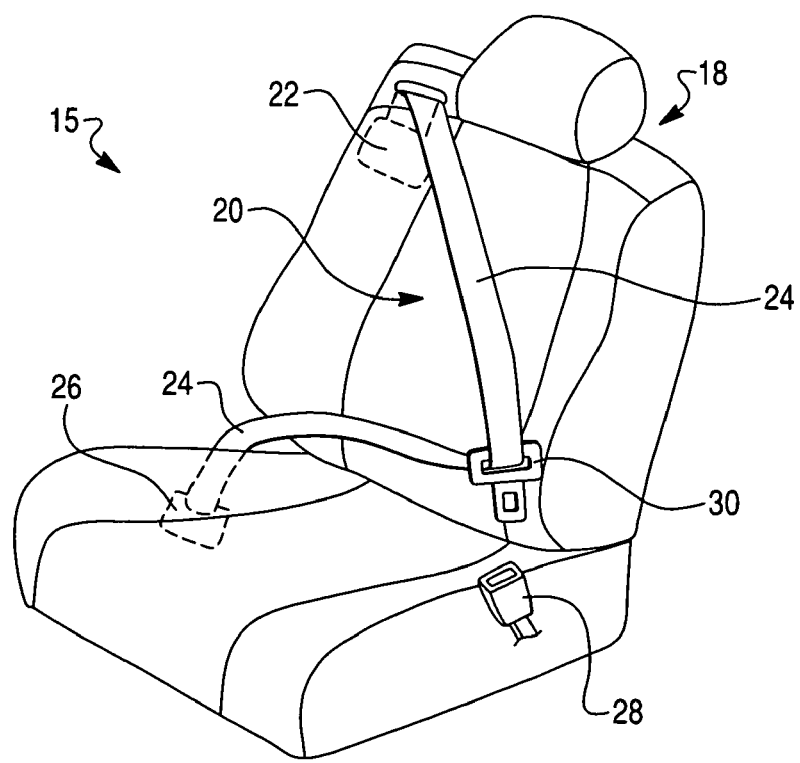
FIG. 2 is a perspective view of an exemplary embodiment of a safety system for use within a vehicle, such as the vehicle of FIG. 1.

Referring to FIG. 2, an exemplary embodiment of an occupant safety system 15 is illustrated, and includes a seat assembly 18 and a safety belt assembly 20. Seat assembly 18 provides seating for an occupant of a motor vehicle, such as the vehicle 10. According to an exemplary embodiment, safety belt assembly 20 is configured as a three-point system and includes a retractor 22, a webbing 24, an anchor 26, a buckle mechanism 28 and a tongue mechanism 30. According to an exemplary embodiment, webbing 24 is coupled at one end to the anchor 26, which may be fixedly coupled to seat assembly 18, and coupled at the other end to retractor 22, which may be fixedly coupled to the seat assembly 18. According to other embodiments, anchor 26 and/or retractor 22 may be coupled to the vehicle 10 or any other component of vehicle 10. According to an exemplary embodiment, buckle mechanism 28 is rotationally coupled to the seat assembly 18 on the side opposite to the anchor 26. According to other embodiments, buckle mechanism 28 may be coupled to the vehicle 10 or any other component of vehicle 10. Tongue mechanism 30 may be slideably coupled along the length of webbing 24 between the end coupled to the anchor 26 and the other end coupled to the retractor 22. Tongue mechanism 30 may be disengageably coupled to the buckle mechanism 28 dividing the webbing 24 into a first portion which covers the lap of the occupant of the seat and a second portion which covers the torso of the occupant of the seat, thereby forming a three-point configuration.

Figure 3:
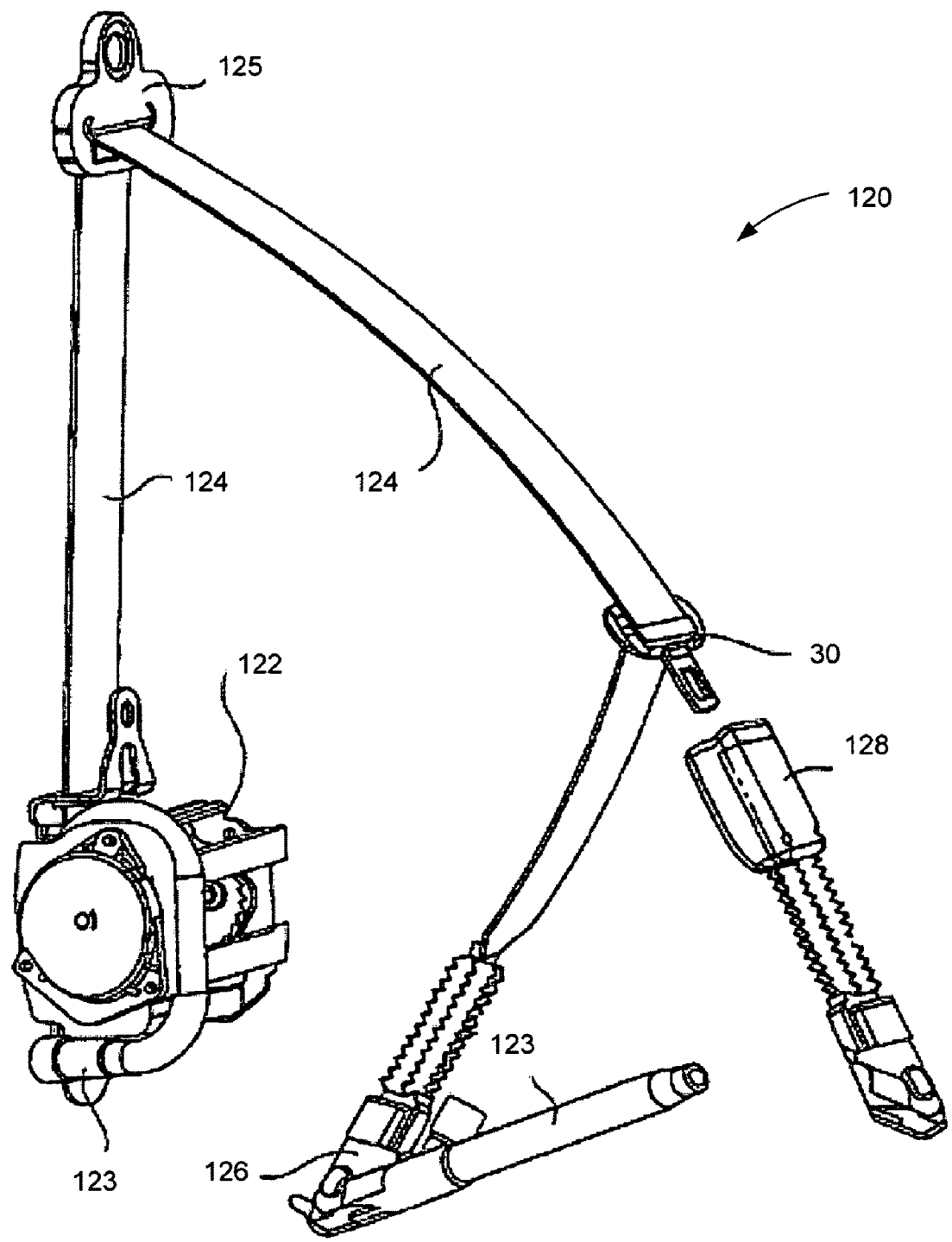
FIG. 3 is a perspective view of another exemplary embodiment of a safety system for use within a vehicle.

Referring to FIG. 3, another exemplary embodiment of a safety belt system 120 is illustrated, and includes a retractor 122, at least one pretensioner 123, a webbing 124, a D-ring 125, an anchor 126, a buckle mechanism 128, and a tongue mechanism 30. Webbing 124 may be coupled at one end to the anchor 126 and at the other end to the retractor 122, which contains a pretensioner 123 for winding the belt in the direction of retraction or tightening. D-ring 125 may be slideably coupled to the webbing 124 along the length of the webbing 124. Tongue mechanism 30 may be slideably coupled to the webbing 124 along the length of the webbing 124 at a position between D-ring 125 and the anchor 126. Tongue mechanism 30 may be disengageably coupled to the buckle mechanism 128.

Figure 4:
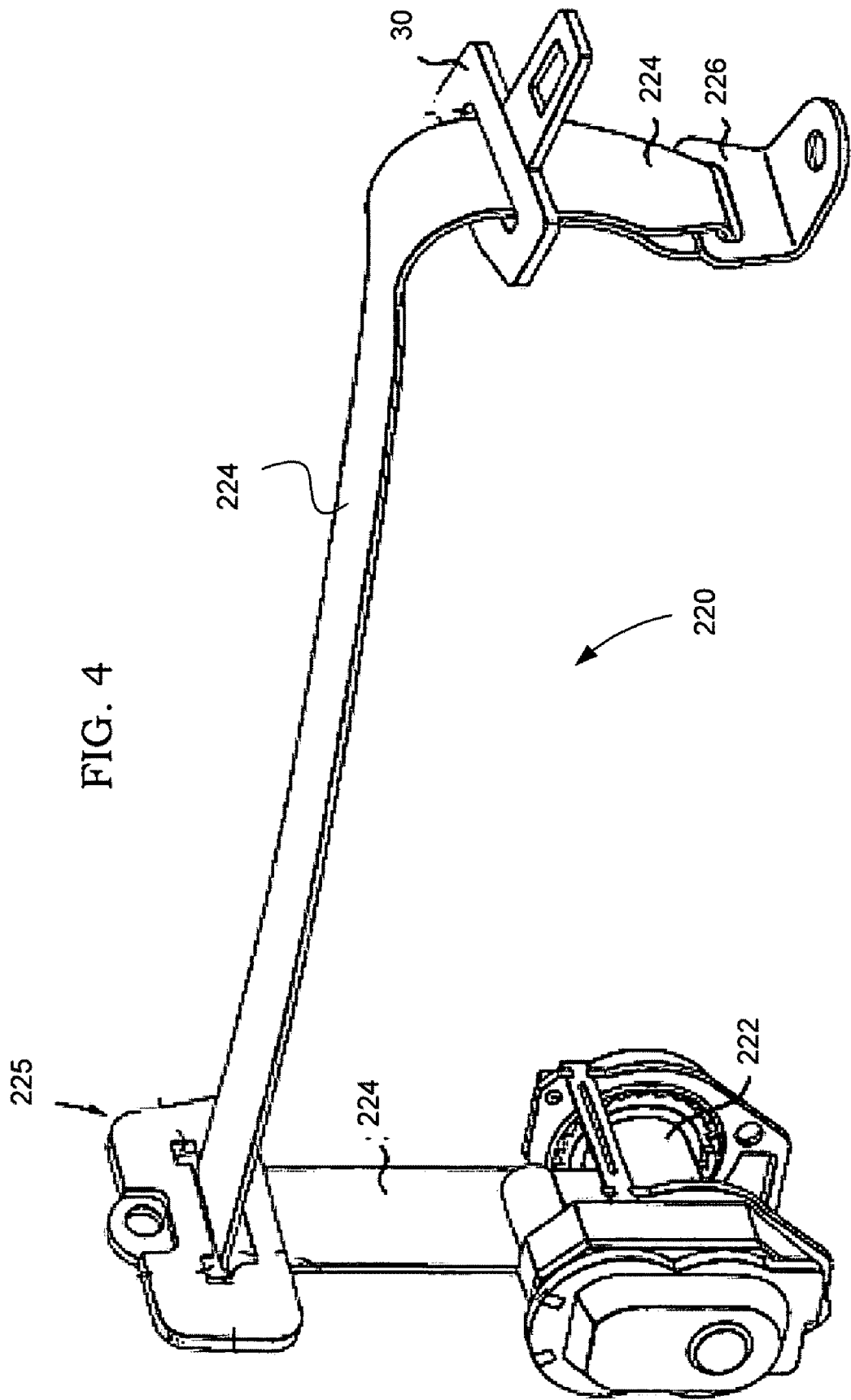
FIG. 4 is a perspective view of another exemplary embodiment of a safety system for use within a vehicle.

Referring to FIG. 4, another exemplary embodiment of a safety belt system 220 is illustrated, and includes a retractor 222, a webbing 224, a D-ring 225, an anchor 226 and a tongue mechanism 30. Webbing 224 may be coupled at one end to the anchor 226 and at the other end to the retractor 222. D-ring 225 may be slideably coupled to the webbing 224 along the length of the webbing 224. Tongue mechanism 30 may be slideably coupled to the webbing 224 along the length of the webbing 224 at a position between D-ring 225 and the anchor 226.

Figure 5:
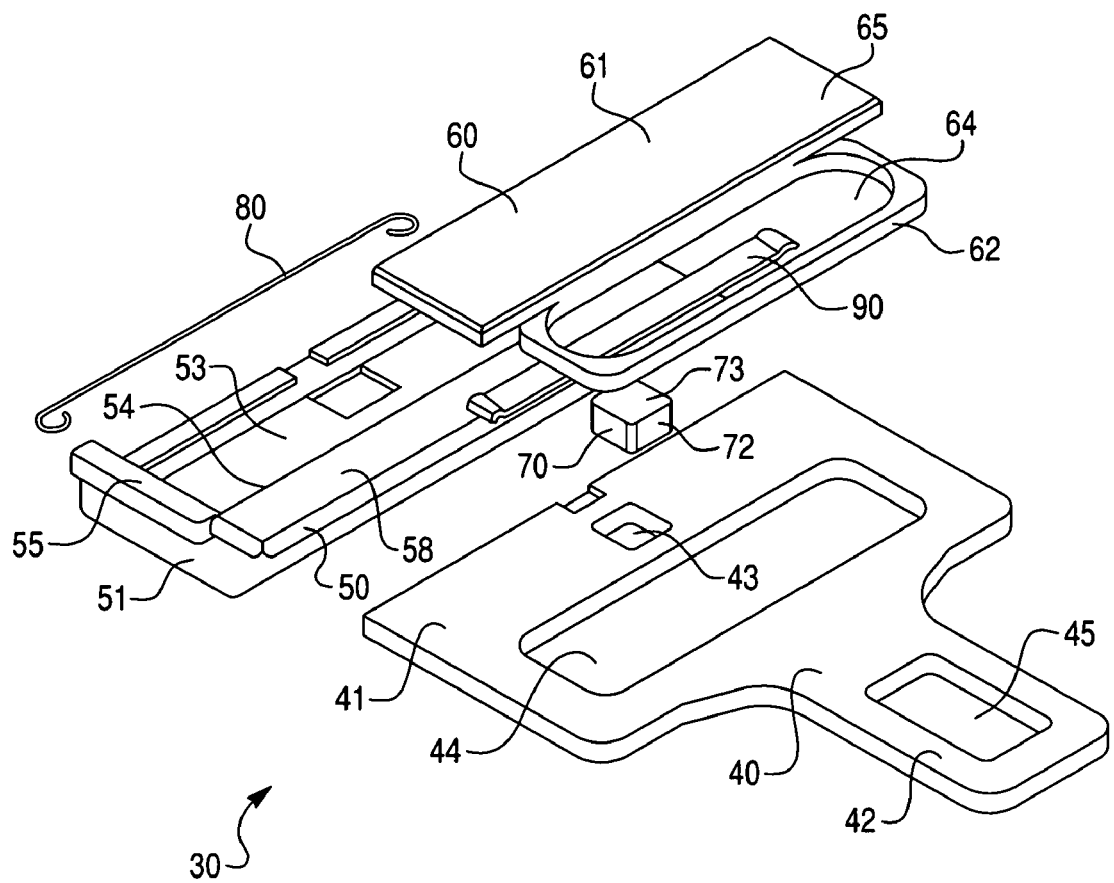
FIG. 5 is an exploded view of an exemplary embodiment of a tongue mechanism for use with a safety system, such as the safety system of FIG. 2.

Referring to FIG. 5, an exemplary embodiment of a tongue mechanism 30 is illustrated, and includes a tongue plate 40, a cinch plate 50, a cover member 60, a blocking member 70, a second biasing member 80, and a first biasing member 90. A tongue plate 40 may be made from steel or other material strong enough to withstand the loads imparted onto it from the restraint of an occupant during a vehicle dynamic impact event. A cinch plate 50 may be made from steel, composite, or polymeric material. A cover member 60 may be made from steel, composite, or polymeric material. A blocking member 70 may be made from steel or other alloy, composite, or polymeric material. A second biasing member 80 and a first biasing member 90 may be made from spring steel or other useful material.

According to an exemplary embodiment, tongue plate 40 may be substantially flat, and include a first end 41 and a second end 42, which is narrow than the first end 41. The first end 41 of tongue plate 40 includes a first aperture 43 for containing blocking member 70, and a second aperture 44 for housing a portion of the cover member 60, which the webbing 24 passes through. The second end 42 of tongue plate 40 includes a third aperture 45 for engaging a locking device, such as the buckle mechanism 28.

According to an exemplary embodiment, cinch plate 50 may be configured substantially flat with a non-uniform thickness, which is typically less than the length or width, and includes two sides 51, a base surface 53, a plateau surface 58, and a cam (or ramp) surface 54, which extends away from the base surface 53 between the two sides 51. The two sides 51 of the cinch plate 50 may include protrusions or walls 55, which extend away from the base surface 53 on the same side as the cam surface 54. The width between the walls 55 of the sides 51 may be configured to retain the width of the first end 41 of the tongue plate 40, to keep the tongue plate 40 from sliding substantially in a side-to-side direction, yet allowing the tongue plate 40 to slide in the cinching direction. The width between the walls 55 of the sides 51 may also be configured to retain the cover member 60 The cinch plate 50 may further include attachment features for the second biasing member 80. The cam surface 54 is configured to include a cam angle to drive the cinching load.

Figure 7:
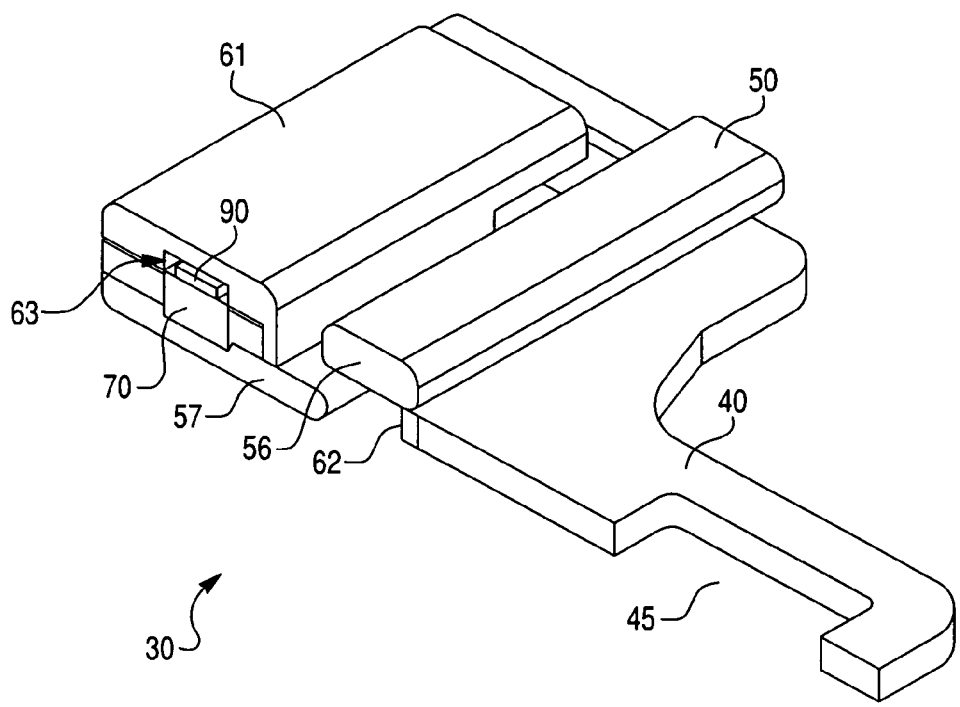
FIG. 7 is a partial sectioned perspective view of the tongue mechanism of FIG. 5, shown in the free falling or non-cinching position.

According to an exemplary embodiment, cinch plate 50 may further include a cinch portion 56 and a loading (or bearing) portion 57, as shown in FIG. 7. Cinch portion 56 provides the contact surface to the webbing 24, and during locking or cinching of tongue mechanism 30, prohibits tongue mechanism 30 from sliding along the length of webbing 24 by engaging and locking the webbing 24 in place relative to the tongue mechanism 30. When the load from an occupant imparts a predetermined load into the webbing 24, such as during a vehicle dynamic impact event, the lap portion of webbing 24, which engages and winds around loading portion 57 of the cinch plate 50, displaces the cinch plate 50 through the loading portion 57 from the tension between the two ends of webbing 24 in the cinching direction.

According to an exemplary embodiment, cover member 60 may be configured substantially flat with a non-uniform thickness, which is typically less than the length or width, and includes a body 61, a sleeve 62, a recess 63, a slot 64, and a cinching surface 65. The body 61 may be substantially rectangular in shape with a width that may be retained between the walls 55 of the cinch plate 50. The sleeve 62 may extend forward and downward from the body 61, and be annular having a substantially elliptical shape with a narrow wall thickness, creating an opening in the center or slot 64. The outside surface or a portion of the outside surface of the sleeve 62 may contact or sit proximate to the inside surface that forms the second aperture 44 of tongue plate 40. The inside surface of the sleeve 62 forms the slot 64, which webbing 24 passes through allowing the tongue mechanism 30 to slide along the length of webbing 24 when not cinched or unlocked. This configuration allows the cover member 60 to be made out of a light weight material that has a lower coefficient of friction, since the tongue plate 40 circumferentially encompasses at least a portion of the height of the sleeve 62 providing the sleeve 62 with strength during loading of the webbing 24. The lower coefficient of friction of the cover member 60 reduces wear on the webbing 24, which results from repetitive sliding between the sleeve 62 and the webbing 24.

According to an exemplary embodiment, the recess 63 of the cover member 60 may be located on the bottom surface, which faces toward the blocking member 70, of the body 61, as shown in FIG. 7. Recess 63 may have a width that accommodates the length of the first biasing member 90, a depth that accommodates the compression of the first biasing member 90 by the blocking member 70, and a length that accommodates the length of the blocking member 70.

According to an exemplary embodiment, blocking member 70 may be a hexahedron or cube shaped member, having six sides or surfaces. Blocking member 70 may be retained within the first aperture 43 of the tongue plate 40, such that blocking member 70 is constrained from fore-aft and side-to-side movement (relative to tongue plate 40) by the walls of the tongue plate 40 that form the first aperture 43, yet may move in the up-down direction. The bottom surface 74 of the blocking member 70 may contact or sit proximate to the base surface 53 of the cinch plate 50, yet the blocking member 70 is not coupled to the cinch plate 50. The top surface 73 of the blocking member 70 may be substantially parallel to the bottom surface 74, and contacts the bottom surface of the first biasing member 90, so that when the blocking member 70 moves in the upward direction (towards the first biasing member 90) it displaces the body of the first biasing member 90 increasing the resulting force on the blocking member 70, which wants to drive the blocking member 70 away from the first biasing member 90. The front surface 72 of blocking member 70 may be in contact with or sit proximate to the cam surface 54 of the cinch plate 50.

Figure 6:
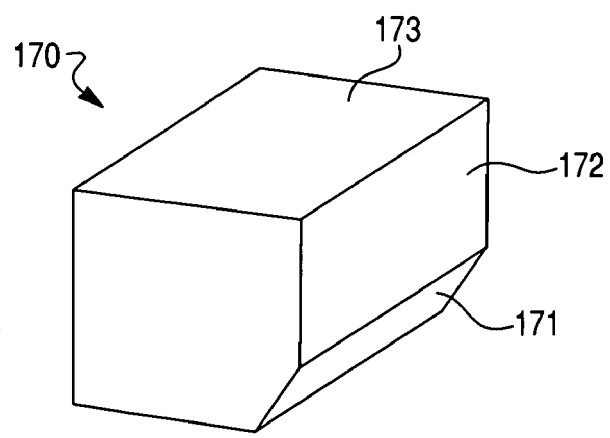
FIG. 6 is a perspective view of an exemplary embodiment of a blocking member for use within a tongue mechanism, such as the tongue mechanism of FIG. 5.

According to an exemplary embodiment, blocking member 170 may be a heptahedron, as shown in FIG. 6. According to other embodiments, blocking members may have any number of sides or may have any useful shape, such as a cylinder, a rectangular block, or any other shape. According to the exemplary embodiment shown in FIG. 6, blocking member 170 includes a top surface 173, a front surface 172, which may be substantially perpendicular to the top surface 173, and a driven surface 171, which may be configured at an angle of inclination with respect to the front surface 172. This angle of inclination may vary depending on application. Driven surface 171 is configured to contact or sit proximate to the cam surface 54 of the cinch plate 50.

Second biasing member 80 may be a coil or plate spring made from a thin wire or plate of spring steel, or other suitable spring type device for biasing the cinch plate 50 toward the tongue plate 40. According to an exemplary embodiment, second biasing member is configured with a relative long body portion and two ends, which may be configured for coupling to the base surface 53 of the cinch plate 50. For example the two ends may form hooks or loops which are retained over embossed posts from the cinch plate 50. The body portion may be configured for coupling to a portion of the tongue plate 40, so that when tongue mechanism 30 is in the unlocked or non-cinch position there is a relatively small amount of preload between the tongue plate 40 and the cinch plate 50 keeping them in the unlocked or non-cinched position. This relatively small preload prevents noise and other related issues by keeping the components from having small amounts of relative motion that can occur without a biasing member.

First biasing member 90 may be a coil or plate spring made from a thin wire or plate of spring steel, or other suitable spring type device for biasing the blocking member 70 toward the cinch plate 50. According to an exemplary embodiment, first biasing member 90 is configured with a relative long body portion and two ends, which may be configured for coupling to the surface of the cover member 60 which forms the top surface of recess 63. The body may be configured to be arc shaped such that the center point of the body (substantially the midpoint between the two ends) sits below (or away from) the ends and contacts the top surface 73 of the blocking member 70. This arc shape creates clearance between the body of the first biasing member 90 and the surface of the cover member 60 that forms the top surface of recess 63, so that the blocking member 70 may displace towards the first biasing member 90, displacing the first biasing member 90 towards the cover member 60, which increases the spring force of the first biasing member 90.

Figure 8:
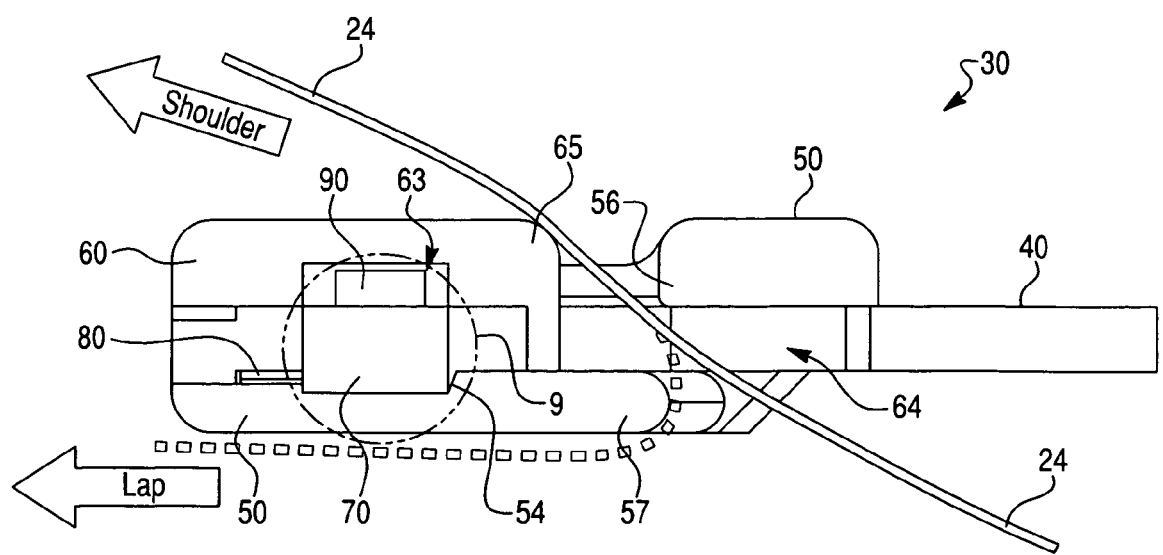
FIG. 8 is a partial sectioned side view of the tongue mechanism of FIG. 5, shown in the free falling or non-cinching position.
Figure 9:
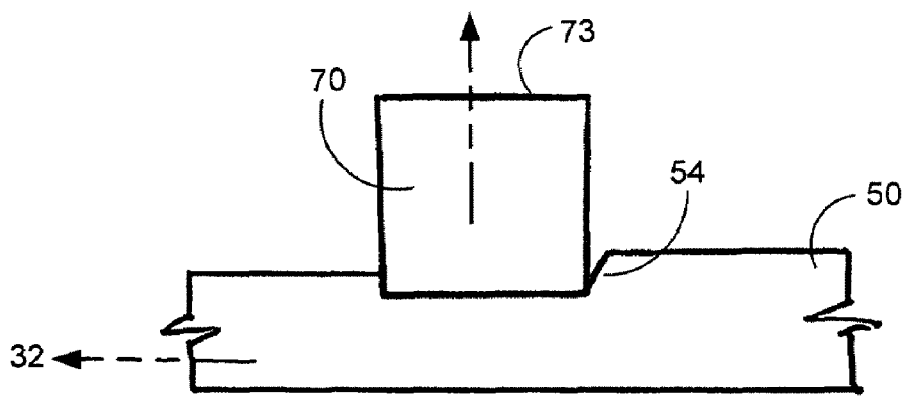
FIG. 9 is a detail view of an exemplary embodiment of a blocking member and a cinch plate configured in the free falling or non-cinching position.

Referring to FIGS. 7 and 8, tongue mechanism 30 is illustrated in the unlocked, non-cinched, or free-falling position. When the tension in webbing 24 is below the predetermined cinching load, which actuates the cinching of tongue mechanism 30, the blocking member 70 is in its first position (shown in FIGS. 7-9), whereby relative motion between the cinch plate 50 and the tongue plate 40 is prevented. When the blocking member 70 is in its first position, the tongue mechanism 30 is slideably coupled to webbing 24, so that tongue mechanism 30 is free to move along the length of webbing 24. The webbing 24 passes through the slot 64 of cover member 60 and between the cinching surface 65 of cover member 60 and the cinch portion 56 of the cinch plate 50. When the tension in the webbing 24 is below the predetermined cinching load, which actuates the cinching of tongue mechanism 30, the friction force between the contacting cam surface 54 of cinch plate 50 and the blocking member 70 is greater than the separation force, which is normal to the cam surface 54. Until the tension in the webbing reaches the cinching load where the separation force overcomes the static friction force, the blocking member 70 remains in its first position, as shown in FIG. 9, which is the free-falling position for the tongue mechanism 30. The cinching load is driven by the configuration of the cam angle of the cam surface 54 in conjunction with the coefficient of friction between the cam surface 54 and the blocking member 70.

Figure 11:
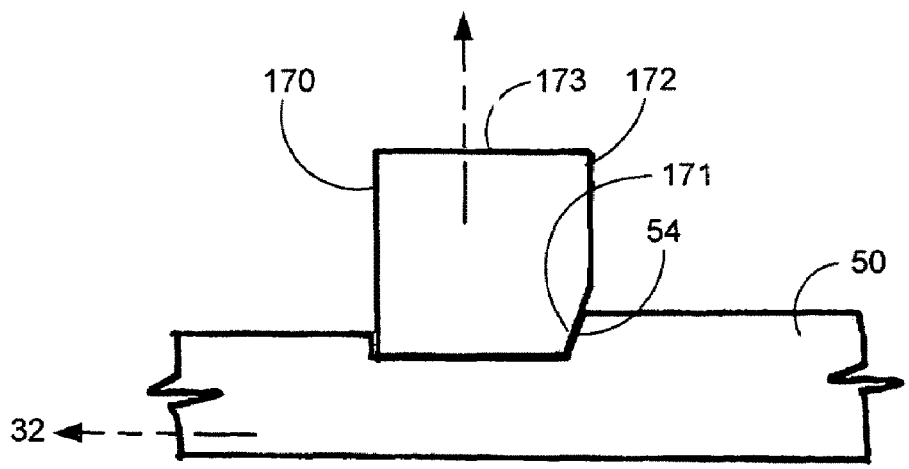
FIG. 11 is a detail view of another exemplary embodiment of a blocking member and a cinch plate configured in the free falling or non-cinching position.

According to another exemplary embodiment, blocking member 170 includes a driven surface 171, which may contact or sit proximate to the cam surface 54 of the cinch plate 50, when the tongue mechanism 30 is in the free-falling or unlocked position. When the tongue mechanism 30 is in the free-falling position, the blocking member 170 is in its first position, as shown in FIG. 11. According to other embodiments, the blocking member and the cinch plate may be configured using any geometry, which allows motion in the cinching direction 32 of the cinch plate to drive the blocking member in a direction perpendicular to the cinching direction 32. Different geometries may be used to vary the parameters, such as the predetermined cinching load, which also may be varied by modifying the coefficient of friction for specific applications.

Figure 12:
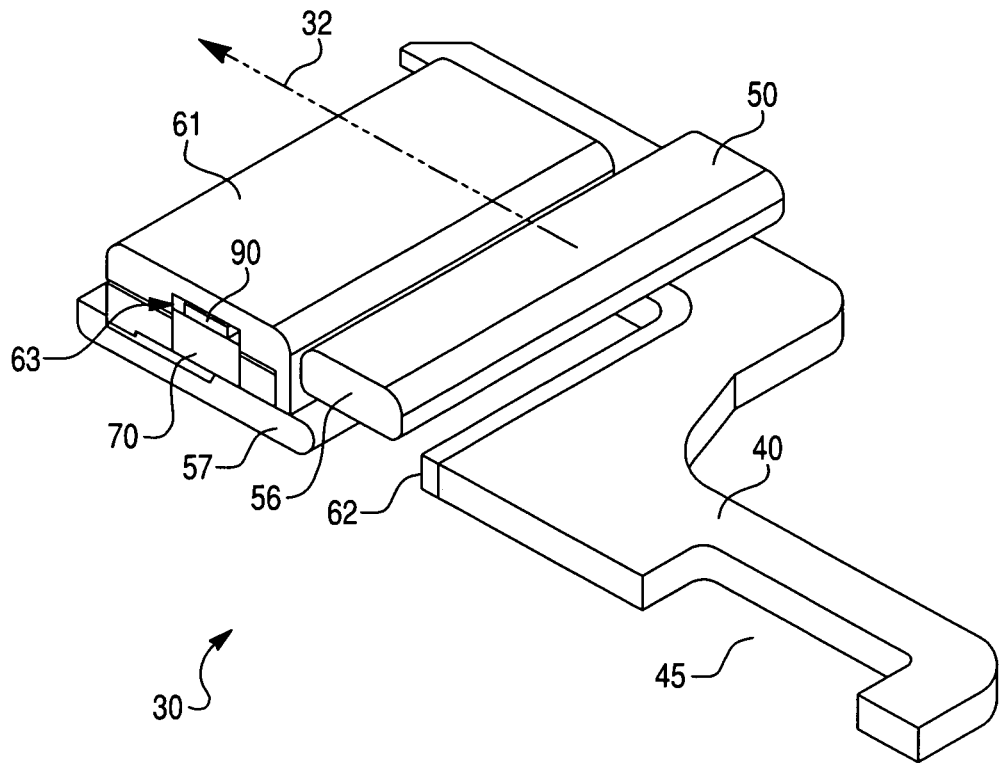
FIG. 12 is a partial sectioned perspective view of the tongue mechanism of FIG. 5, shown in the locking or cinching position.
Figure 13:
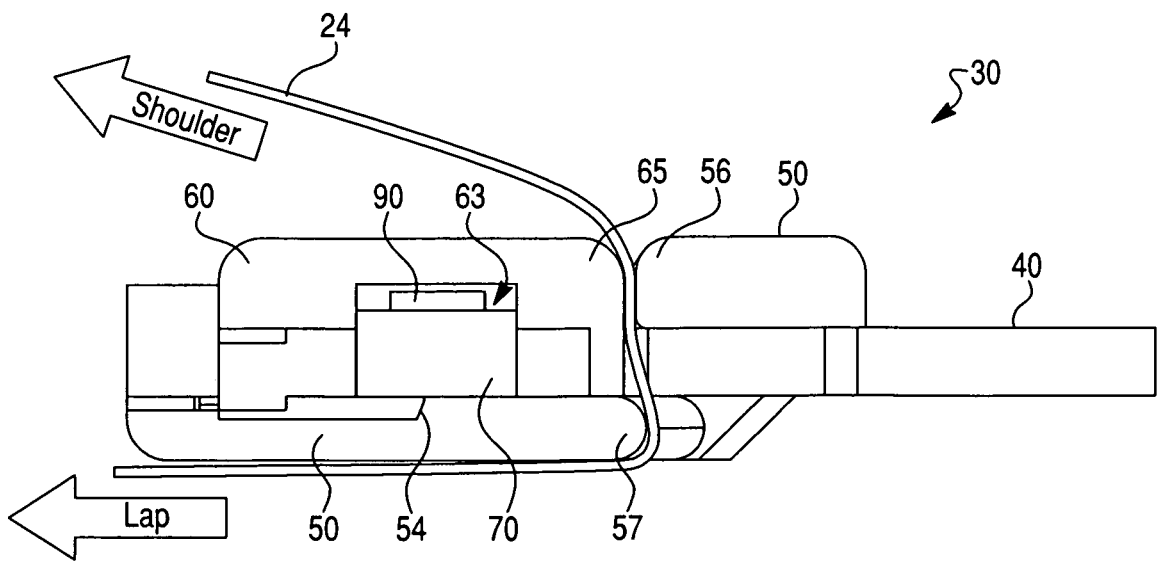
FIG. 13 is a partial sectioned side view of the tongue mechanism of FIG. 5, shown in the locking or cinching position.

Referring to FIGS. 12 and 13, tongue mechanism 30 is illustrated in the locked or cinched position. When the load from an occupant imparts a predetermined load or tension into the webbing 24, such as during a vehicle dynamic impact event, the lap portion of webbing 24 engages and winds around loading portion 57 of the cinch plate 50, such that the loads through the lap portion and the shoulder portion of webbing 24 are in directions substantially away from the buckle mechanism 28. These loads from the webbing 24 impart forces into the loading portion 57 of cinch plate 50 of tongue mechanism 30. When the force imparted into the loading portion 57 reaches the cinching load the cinch plate 50 begins to displace in the cinching direction 32 relative to the other components (e.g., tongue plate 40, cover member 60, blocking member 70) of the tongue mechanism 30, which remain relatively fixed to buckle mechanism 28.

Figure 10:
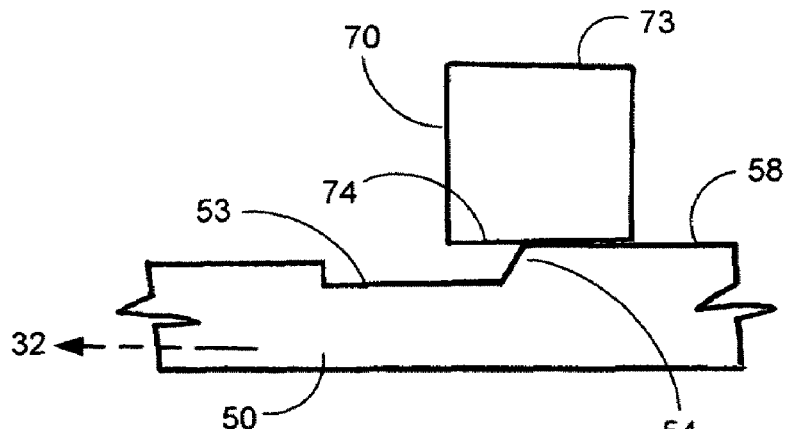
FIG. 10 is a detail view of the blocking member and the cinch plate of FIG. 9 configured in the locking or cinching position.

When the cinch plate 50 displaces in the cinching direction 32 relative to the tongue plate 40, the cam surface 54 displaces the blocking member 70 in the direction perpendicular to both the cinching direction 32 and to the top surface of blocking member 70, or in the upwards direction. The blocking member 70 moves in the upward direction because it is prohibited from fore-aft and side-to-side motion by the tongue plate 40, which encompasses the blocking member 70 and does not move relative to the cinch plate 50 during locking or cinching. This upwards displacement of the blocking member 70 continues as the blocking member 70 rides up the cam surface 54, and in turn compresses the body of the first biasing member 90, creating more potential return energy. It should be noted that the first and second biasing members 90, 80 are illustrated in their non-displaced positions in FIGS. 12 and 13, instead of their displaced positions. Once the bottom surface 74 of the blocking member 70 raises clear of the cam surface 54 (i.e., the bottom surface 74 of the blocking member 70 clears the ramp surface and is flush or just above the plateau 58 of the cinch plate 50), as shown in FIG. 10, the cinch plate 50 may move relative to the tongue plate 40. When the cinch plate 50 is permitted to move relative to the tongue plate 40, the blocking member 70 is in its second position.

When the blocking member 70 is in its second position, the cinch plate 50 can move substantially free in the cinching direction 32 until the webbing 24 is cinched between the cinch portion 56 of the cinch plate 50 and the cinching surface 65 of the cover member 60. When the webbing 24 is cinched or clamped between the cinch portion 56 and the cinching surface 65, due to the cinching load, the tongue mechanism 30 applies a cinching force to prevent the webbing 24 from changing position relative to the tongue mechanism 30. Once the webbing 24 is cinched or clamped, increased tension induced into webbing 24 subsequently increases the clamp force (i.e., force normal to the webbing) and the friction force (i.e., force in plane with the webbing) prohibiting relative movement between the webbing 24 and the tongue mechanism 30. Therefore the tongue mechanism 30 is cinched to the webbing 24 until the tension in the webbing 24 drops below the cinching load.

According to an exemplary embodiment, when cinch plate 50 moves in the cinching direction 32 it displaces the body of second biasing member 80 relative to its ends, which increases the spring force (resultant force into the tongue plate 40 and cinch plate 50). When the tension through the webbing 24 drops below the cinching load the (return) spring force of second biasing member 80 drives the cinch plate 50 in the direction opposite to the cinching direction 32, unclamping or releasing the webbing 24, so that the tongue mechanism 30 is free to move along the length of webbing 24. The second biasing member 80 drives the cinch plate 50 until the cam surface 54 passes the blocking member 70, then the (return) spring force of the first biasing member 90 drives the blocking member 70 downward until it reaches its first position, as shown in FIG. 8. When the blocking member 70 returns to its first position, relative movement between the cinch plate 50 and the tongue plate 40 is prevented.

According to another exemplary embodiment, a tongue mechanism may include one biasing member, which is configured to provide energy to return both the blocking member and the cinch plate to the neutral or unlocked position. According to another exemplary embodiment, a tongue mechanism may be configured to not have a spring, whereby the return of the cinch plate (and hence the blocking member) would be done manually. This configuration would lock under when the tension in the webbing reach the cinching load, and after the tension in the webbing was reduced below the cinching load the occupant could manually reset the tongue mechanism to be slideable along the length of the webbing, or be configured to free-fall.

It should be noted that lubrication, such as a grease, could be added between the cam surface 54 of the cinch plate 50 and the blocking member 70 to lower the coefficient of friction to improve function and reduce wear. The lubrication could also be used to vary the cinching load that induces the blocking member to displace free of the cinch plate for the tongue mechanism to lock or cinch the webbing. It should also be noted the cam angle of the cam surface 54 of the cinch plate 50 may be modified to vary the cinching load. By varying either or both of the coefficient of friction and the cam angle of the cam surface, the cinching load of a tongue mechanism may be tailored for specific applications.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the tongue mechanisms as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention

What is claimed is:

1. A seat belt system for use in a vehicle, comprising:
a seat belt webbing for restraining an occupant of the vehicle, wherein the webbing includes a first end and a second end, wherein the first end of the webbing is attached to a retractor for either retracting the webbing or permitting withdrawal of the webbing, and wherein the second end of the webbing is connected to an anchor;
a tongue mechanism connected to the webbing and positioned to separate the webbing into a lap portion and a shoulder portion;
a buckle mechanism configured to detachably couple with the tongue mechanism;
wherein the tongue mechanism is configured so that the tongue mechanism is slideably coupled to the webbing when the tension in the webbing is less than a cinching load, and when the tension in the webbing is equal to or greater than the cinching load the tongue mechanism applies a cinching force on the webbing to prevent the webbing from changing position relative to the tongue mechanism,
wherein the tongue mechanism is configured so that when the tension in the webbing is less than the cinching load there is no cinching force applied to the webbing, and
wherein the tongue mechanism includes a first biasing member and a second biasing member, wherein the second biasing member is for biasing a cinch plate into a position that permits relative movement between the webbing and the tongue mechanism and wherein the tongue mechanism is configured so that when the tensile force on the webbing drops below the cinching load after having previously exceeded the cinching load the second biasing member forces the cinch plate into a position wherein a blocking member can be forced into a first position by the first biasing member.

2. The system of claim 1, wherein each of the first and second biasing members comprise one of a coil or a plate spring.

3. The system of claim 1, wherein the tongue mechanism includes a tongue plate and wherein the cinching force on the webbing is applied by changing the position of the cinch plate relative to the tongue plate.

4. The system of claim 3, wherein the blocking member is located in the first position to prevent relative movement between the cinch plate and the tongue plate and wherein the tongue mechanism is configured so that the position of the blocking member changes from the first position to a second position when the tensile force on the webbing meets or exceeds the cinching load to thereby permit relative movement between the cinch plate and the tongue plate.

5. The system of claim 4, wherein the first biasing member is for biasing the blocking member from the second position into the first position.

6. The system of claim 4, wherein the tongue mechanism further includes a cover member having a recess on a bottom surface of the cover, wherein the recess includes a width configured to receive the length of the first biasing member, a depth configured to receive the first biasing member and a length configured to receive the length of the blocking member.

7. The system of claim 4, wherein the cinch plate includes a base surface, and a cam surface extending from the base surface.

8. The system of claim 7, further comprising a plateau surface extending from the base surface and wherein the blocking member is located flush with or above the plateau surface when the blocking member is in the second position.

9. The system of claim 7, wherein the blocking member contacts or is proximate to the cam surface when the blocking member is in the first position.

* * * * *